3,434,737
TRACTOR HITCH
Alfred J. Bailey, Berkswell Village, near Coventry, and James D. Greig, Warwick, England, assignors to Massey-Ferguson Services N.V., Curacao, Netherlands Antilles
Filed Feb. 23, 1967, Ser. No. 617,976
Claims priority, application Great Britain, Mar. 2, 1966, 9,088/66
Int. Cl. B60d 1/04
U.S. Cl. 280—461      11 Claims

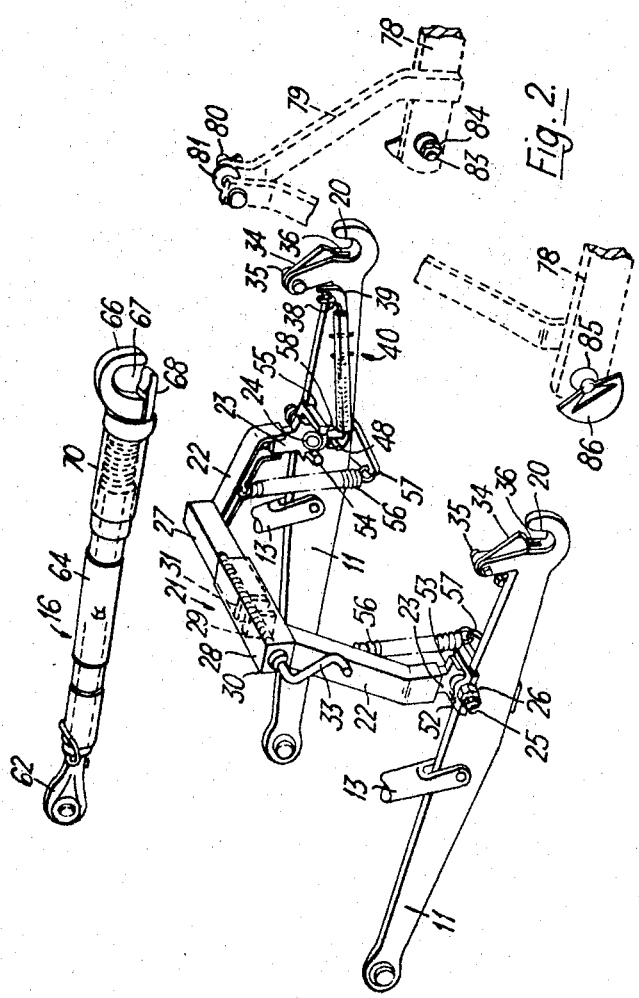

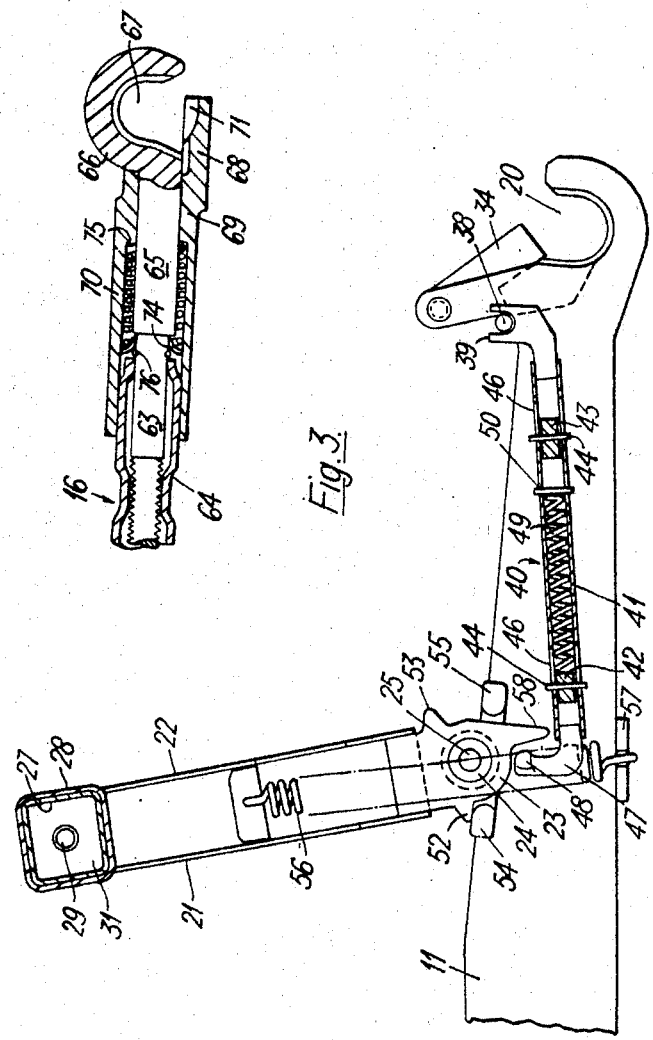

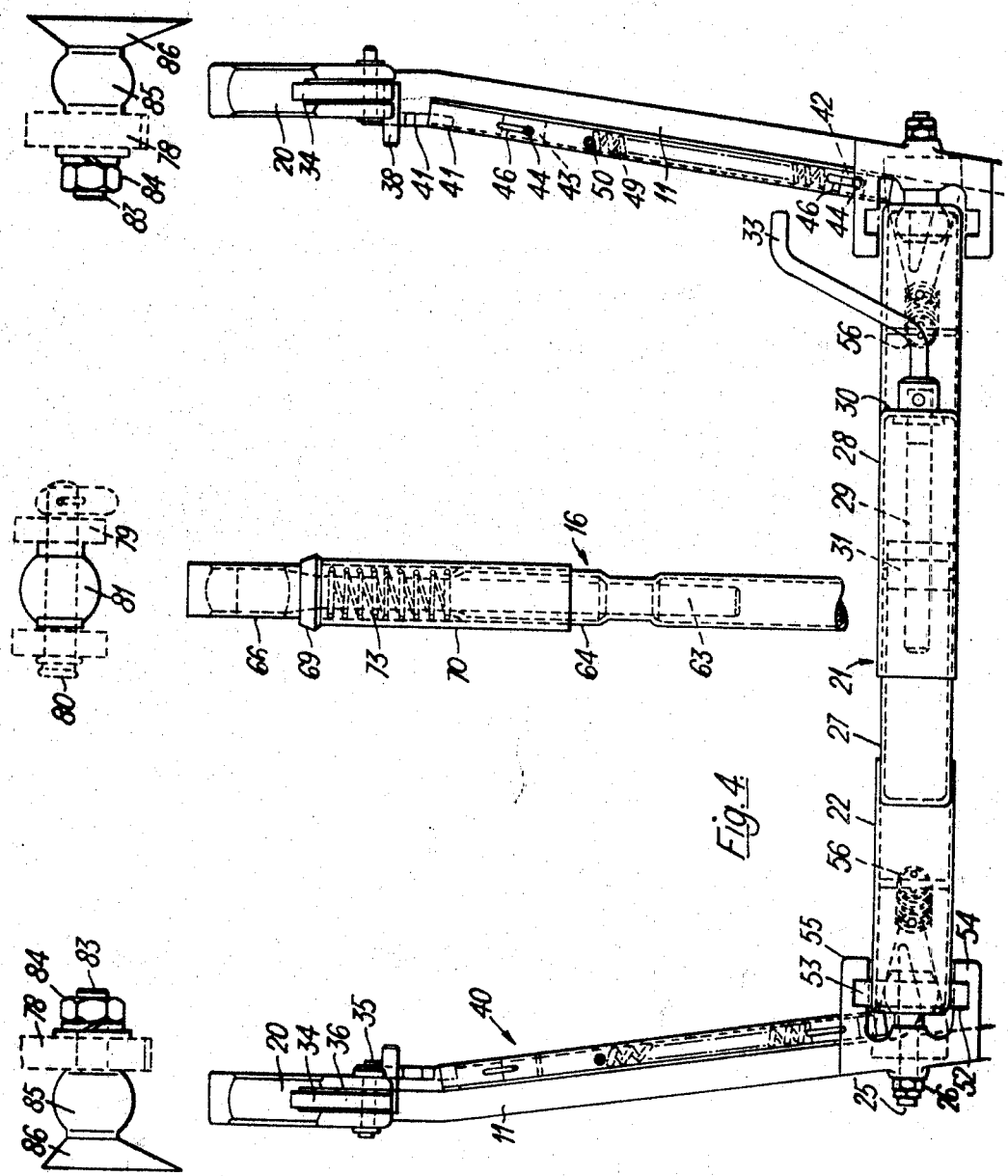

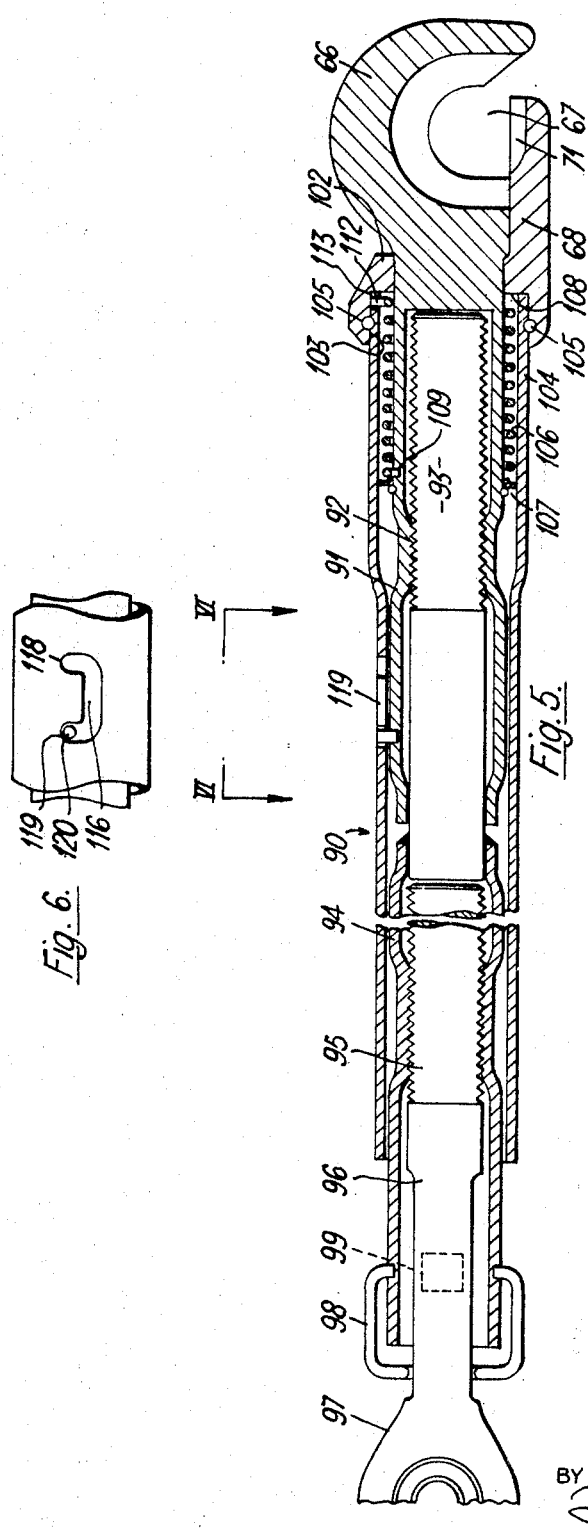

ABSTRACT OF THE DISCLOSURE

A power-operated hitch for attaching implements to tractors, of the type including a pair of lower draft links and a top link all universally pivoted to the tractor body at their forward ends and having connectors at their trailing ends engageable with complementry connectors carried by an implement, and means for selectively adjusting the spacing between the lower links.

Summary of the invention

A tractor hitch according to the invention, includes a pair of laterally spaced draft links universally connectible at their forward ends to a tractor and also connectible to the tractor power lift for controlled raising and lowering movement about their connections to the tractor. The draft links have connectors at their trailing ends for engagement with complementary connectors carried by an implement, and locking means for releasably locking the connectors in the engaged position. A link-spacing member is universally pivotally connected to each of the draft links intermediate their ends, which is preferably adjustable in width, and forms a lock operating member for the locking means.

The top link for the hitch has an open-ended recess at its trailing end adapted to receive an attachment bearing carried by an implement, and locking means movable relative to the link to and from a locking position overlying the recess and maintaining the implement attachment bearing in the recess. The locking means includes a tubular sleeve surrounding the link and urged by resilient means into the locking position.

Brief description of the drawings

FIG. 2 is a perspective view of the hitch shown in FIG. 1;

FIG. 3 is a side elevation, partly in section, of a part of the hitch showing the locking means in detail;

FIG. 4 is a plan view of a part of the hitch together with a portion of an implement to be attached thereto;

FIG. 5 is a side elevation in section of an alternative top link; and

FIG. 6 is a view of a fragment of the link in the direction 8—8 of FIG. 5.

FIG. 1 illustrates the rear end of a tractor 10 having a power-operated hitch including a pair of laterally spaced draft links 11 universally pivotally connected at 12 to the tractor body. The draft links are also connected through lift links 13 and crank arms 14 to a cross shaft 15 which is rotatable by a hydraulic ram to lift and lower the links 11. The tractor is also provided with a top link 16 universally pivotally connected at 17 to the tractor body.

Figure 1:
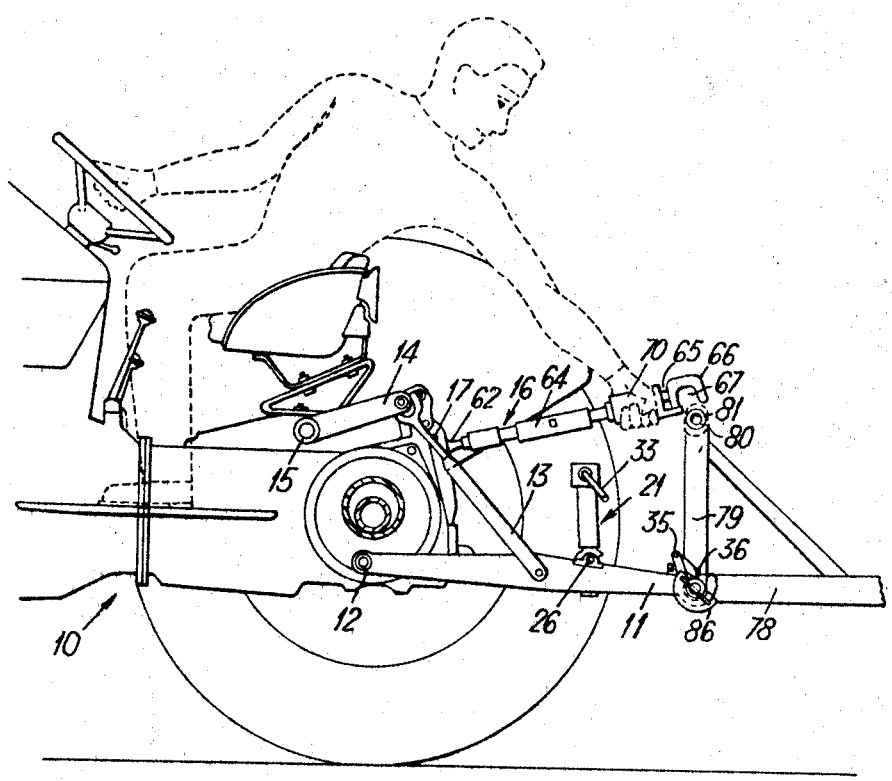
FIG. 1 is a side elevation of a tractor including a hitch embodying the invention.

The hitch described above is of the conventional three-point type and usually the draft and top links are provided with ball and socket universal joints which receive pins on an implement. Under these circumstances, since the links are universally connected to the implement and the tractor, the implement will be free to swing laterally relative to the tractor and to move vertically under the control of the tractor power lift. The conventional method of attachment of the implement is, however, in many circumstances rather difficult, and to make this into a more simple task, each draft link in the embodiment is provided at its rear end with a connector comprising an open topped recess 20 (FIGS. 2 and 3) having a surface of part-spherical contour. Also to maintain the draft links at the required spacing, that is the spacing of the implement lower link pins, a cross member 21 is universally pivoted to the draft links.

The cross member 21 is formed from two generally upwardly extending members 22 each carrying at its lower end a housing 23 for a ball 24 of a ball and socket joint. Pins 25 rigidly attached to the draft links as by nuts 26, pass through the balls 24 so that the cross member is universally pivoted on each draft link. The members 22 carry generally horizontally extending parts 27, 28 of non-circular section, the part 27 being slideably telescoped into the part 28. To control the telescoping of the parts 27, 28 the part 27 is provided with a threaded rod 29 rotatably mounted in the end cap 30 and engaging a threaded opening in the end wall 31 of the part 27. A crank handle 33, forming part of the rod 29, extends beyond the end wall 30 so that rotation of the handle by the operator will control telescoping movement of the parts 27 and 28.

In addition to controlling the spacing of the draft links 11 the cross member 21 also acts to control latches 34 which are pivotally connected to lugs 35 and extend from slots 36 provided on each draft link 11. The latches 34 are pivotable between the locking position shown in FIG. 2 where they block the open tops of the recesses 20 and an unlocking position where they are retracted into the slots 36 so that the recesses are open. Each latch 34 is provided with an inwardly extending pin 38 which engages the forked end 39 of a latch actuator 40 including a channel member 41 slidably mounted on spaced blocks 42, 43 rigidly attached to the inside vertical face of the associated draft link and guided by pins 44 mounted in the guide blocks and extending through slots 46 in the upper and lower faces of the channel member 41.

Rigidly attached to the forward end of the channel 41 is an upwardly extending trigger 47 having an inwardly projecting pin 48 at its upper end. A compression spring 49 is enclosed by the channel member 41 and the draft links and extends from the guide block 42 to a pin 50 passing through the channel member 41 so that the spring tends to move the actuator 40 to the right as viewed in FIG. 3, that is to the locking position.

The link spacing member 21 is rotatable about the pin 25 between lock operating forward and rearward positions determined by two abutments 52, 53 on the housing 23 engageable respectively with projections 54, 55 extending inwardly from the draft links. An over-center spring 56 extends from an anchor bracket 57 on each draft link to the associated member 22 to maintain the cross member 21 in the selected position.

A finger 58 projects downwardly from each housing 23 to cooperate with the associated pin 48 on the trigger 47 so that in the position shown in FIG. 3 the fingers are retracted from the pins to allow the latch actuators 40 to move rearwardly under the influence of the springs 49 so that the latches 34 take up their locking positions. Movement of the cross member 21 to its rearward position where the abutments 53 engage the projections 55 will cause the fingers 58 to engage the pins 48 and move the latch actuators forwardly withdrawing the latches 34 into the receses 36.

The top link 16 includes front and rear portions 62, 63 respectively having oppositely threaded ends engaged in a central barrel 64 so that rotation of the barrel will change the total length of the link.

The rear portion 63, has an increased diameter outer end 65 (FIG. 3) terminating in a hook 66 disposed to provide an open bottomed recess 67, having a surface of part-spherical contour. A locking tongue 68 is formed on the lower side of a collar 69 slideably mounted on the link outer end 65, and extends over the opening of the recess 67. A sleeve 70 having a greater inner diameter than the collar is attached thereto and extends forwardly to house a spring 73 surroundig the outer end 65. The sleeve 70 is slideably mounted at its forward end on the barrel 64.

A retaining collar 74 abuts against a retaining ring 76 on the rear portion 63 to form an abutment against which the forward end of the spring 73 acts. The rear end of the spring abuts the forward face 75 of the collar 69 to urge the locking assembly including the tongue 68, collar 69, and sleeve 70 rearwardly to close the recess 67. The tongue 68 is provided with a contoured upper surface 71 so that in the locked position it forms a continuation of the part-spherical surface of the recess 67.

Part of an implement, suitably modified to accommodate the above described hitch assembly is illustrated in FIGS. 1, 2 and 4, parts which are identical to a conventional three-point hitch implement being shown in dotted outline and modified or additional parts being shown in full lines. The implement includes main frame members 78 carrying an A-frame 79 having a bifurcated upper end between which a pin 80 normally extends to pass through the conventional ball and socket of the usual three-point hitch. The only modification required to accommodate the top link of the present hitch is the addition of a ball 81 mounted on the pin 80 and having a part-spherical outer surface to form a complementary connector to mate with the surface of the recess 67 and tongue 68.

Also each usual lower attachment pin is replaced by a pin 83 rigidly attached to the frame, as by a nut 84, and carrying a ball 85 having a part-spherical surface forming a complementary connector to cooperate with the surface of the associated lower link recess 20. Rigidly attached to, or forming part of, the pin 83 is a flared guide flange 86 which extends forwardly and flares outwardly from the pin to guide the associated lower link into position.

In operation, starting from the condition in which the implement is not attached to the tractor, the operator firstly insures that the lower links are set to the transverse spacing appropriate to the implement, and if necessary, adjusts the lower link spacing by rotation of the crank handle 33. He then insures that the top link is placed so that it will not foul the implement A-frame, or alternatively raises it and retains hold of it. The tractor is now reversed towards the implement and the links set so that, with the guidance of the flanges 86, the recesses 20 become positioned beneath the balls 85. The lower links are now raised by manipulation of the tractor hydraulic power lift controls until the balls 85 are fully engaged in the recesses 20.

During this operation the cross member 21 may be in either its forward or rearward position. In the event that it is in the former position, by virtue of the one way connection between it and the latch actuators, the weight of the implement would be sufficient to push the latches into the slots 36 against the action of the springs 49 which will then return the latches to the locking position after the balls 85 are engaged in the recesses 20.

The operator now grips the sleeve 70 and by pulling it towards him retracts the tongue 68 so that the recess 67 can be placed over the ball 81 as indicated in FIG. 1. In the event that they do not correctly mate the distance between the ball 81 and the top link tractor connection 17 can be adjusted either by raising and lowering the power lift or, if necessary, adjusting the length of the top link by rotating the barrel 64. When the operator releases the sleeve 70 the spring 73 will automatically move the tongue rearwardly to close the recess 67.

With the implement attached to the tractor the draft and top links are universally pivoted to the tractor body at 12 and 17 the cross member 21 to the draft links at 24, and the implement to the ends of the draft and top links. Thus despite the addition of the cross frame 21 and the modifications to the link ends, the implement is still free to swing laterally relative to the tractor.

The hitch above described can easily be adjusted within wide limits to suit various implements and any conventional three-point implement needs only very slight modification to make it suitable for the hitch.

FIGS. 5 and 6 show an alternative form of top link 90 which, while it is working on similar principles to the previously described link 16 incorporates some further features. As with the previous example, the link includes at its rear end a hook 66 having an open bottomed recess 67 of part-spherical contour. The hook is rigidly attached to the rear end of a tube 91 threadedly engaged at 92 with a shaft 93. A tube 94 rigidly attached to, and extending forwardly from, the front end of the shaft 93 threadedly engages, at 95, a shaft 96 which carries the ball and socket joint 97 adapted to be pivotally connected to the tractor at the pivot 17 (FIG. 1).

A clip 98 pivoted on the tube 94 normally engages the shaft 96 to prevent rotation. To adjust the link length assuming the hook 66 and shaft 96 are held stationary, such as by their connections with the implement and tractor respectively, the clip 98 is swung out of engagement with the shaft 96. Rotation of the shaft and tube unit 93, 94 using a turnbuckle 99 provided on the tube 94, will then cause the shaft 96 and tube 91 to move in opposite directions.

The tongue 68, which has a recess 71 similar to the previous example, is rigidly attached to a collar 102 terminating at its forward end in an annular recess 103 surrounding a sleeve 104 nonslideably but rotatably attached thereto as by groove pins 105. A spring 106 surrounds the tube 91 and a retaining collar and clip 107 mounted on the tube 91 forms an abutment against which the forward end of the spring 106 acts. The rear end of the spring abuts the inner face 108 of the recess 103 to urge the locking assembly including the tongue 68, collar 102, and sleeve 104 to the locking position. The front of the spring has an inwardly turned end 109 which engages a detent 110 in the tube 91 and the rear of the spring has an outwardly turned end 112 which engages a slot 113 in the end of the sleeve 104.

The sleeve 104 is provided with a slot having a central longitudinally extending portion 116 and two spaced, peripherally-extending portions 117, 118 to form a gate 119. A pin 120 extends from the tube 91 into the gate 119. The tube sleeve 104, collar 102 and tongue 68 are slideable from a position in which the tongue is in the locking position, as shown in FIG. 7 when the slot 117 is aligned with the pin to an unlocked position where the pin is aligned with the slot 118.

During assembly the parts are first fitted together, the distance between the retainer 107 and the face 103 being such that the spring 106 is under compression. The sleeve 104 is then rotated, and the pin 120 placed in position. Since the spring is anchored at one end in the sleeve and at the other in the tube 91, this rotation will place the spring also under torsion so that it will tend to rotate the tube 104 when it is released. The pretorsioning which is given is such that if a portion 117 or 118 of the gate 119 is aligned with the pin 120 then rotation of the tube will take place until the pin 120 prevents further rotation by abutting against the slot portion 117 or 118 removed from the longitudinal portion 116.

Thus the torsion of the spring will automatically cause the pin to be located in either the slot 117 or 118 depending on which it is aligned with, so locking the sleeve against longitudinal sliding movement to prevent, in the case when the pin is in the slot 117, inadvertent unlatching of the tongue 68. Similarly when it is required to attach or detach the implement, the operator on the tractor seat may grasp the sleeve 104, rotate it slightly to align the pin 120 with the slot portion 116 and then pull it towards him and engage the pin in the slot 116, when the tongue 68 will then automatically be held in the unlocked position. Thus, the operator has no need to continually hold the tongue in the unlocked position while maneuvering the link. In the case where he is attaching an implement, all that is necessary, after the recess 67 is engaged with the implement ball 81, is to slightly rotate the sleeve 104 when the tongue will, under the influence of the compression force in the spring, automatically close the recess 67 after which the sleeve will then also without further attention from the operator, rotate to lock against sliding movement. For ease of operation, the sleeve 104 extends over substantially the whole length of the link 90 so that the operator may easily reach it under any conditions.

While specific examples of the invention have been described and illustrated, it should be understood that the invention is not limited to the exact construction shown, but that various alterations in the construction and arrangement of parts can be made by those skilled in the art without departing from the scope and spirit of the invention.

We claim:

1. A power-operated tractor hitch including a pair of laterally spaced draft links universally connectible at their forward ends to a tractor and also connectible to the tractor power lift for controlled raising and lowering movement about their connections to the tractors, said draft links having connectors at the trailing ends thereof for engagement with complementary connectors carried by an implement, locking means for releasably locking the connectors in the engaged position, and a link-spacing member universally pivotally connected to each of said links intermediate their ends.

2. A power-operated tractor according to claim 1 in which said link-spacing member is adjustable in width.

3. A power-operated tractor hitch according to claim 2 in which said link-spacing member is an inverted U-shaped frame, the base of the U being formed of telescoping members for altering the width of the frame.

4. A power-operated tractor hitch according to claim 3 further including a crank handle rotatably mounted in one member of the frame and screw-threadedly engaged with the other relatively movable member for adjusting the width of said frame.

5. A power-operated tractor hitch according to claim 1 in which said link-spacing member forms a lock-operating member for said locking means.

6. A power-operated tractor hitch according to claim 5 further including abutment means on the draft links for limiting pivotal movement of said spacing member in a generally fore-and-aft direction.

7. A power-operated tractor hitch according to claim 6 further including an over-center spring for urging said spacing member against one or the other of said abutment means.

8. A power-operated tractor hitch according to claim 5 in which said connectors are upwardly open hooks and said locking means includes latches movable over the hook openings to at least partially close same, and including slideable latch actuators having portions adapted for engagement with projections depending from said spacing member, said latches being connected to said slideable latch actuators.

9. A power-operated tractor hitch according to claim 8 in which said latch actuators are spring-urged into a position in which said latches extend over said hook openings.

10. A top link for use with a three-point tractor hitch, the top link having an open-ended recess at its trailing end adapted to receive an attachment bearing carried by an implement, and locking means movable relative to the link to and from a locking position overlying the recess and maintaining the implement attachment bearing in the recess, said locking means including a tubular sleeve surrounding the link and urged by resilient means into said locking position, said link including front and rear portions having oppositely threaded parts engaged with a common rotatable intermediate portion so that on rotation of the latter, the length of the link is altered, one of said portions comprising a threaded rod threadedly engaging the inner wall of an internally threaded tube forming the intermediate portion and the other portion comprising an internally threaded tube threadedly engaging a rod secured to the first mentioned tube for rotation therewith.

11. A top link for use with a three-point tractor hitch, the top link having an open-ended recess at its trailing end adapted to receive an attachment bearing carried by an implement, and locking means movable relative to the link to and from a locking position overlying the recess and maintaining the implement attachment bearing in the recess, said locking means including a tubular sleeve surrounding the link and urged by resilient means into said locking position, said link including front and rear portions having oppositely threaded parts engaged with a common rotatable intermediate portion so that on rotation of the latter, the length of the link is altered, said resilient means arranged to apply a torque to said tubular sleeve, the latter being formed with a gate engaged by a pin projecting from the link, said gate having limit positions corresponding to locked and unlocked positions and said sleeve being manually rotatable and axially movable against said resilient means to locate the pin in either of said limit positions to secure the locking means in either locked or unlocked condition.

References Cited
UNITED STATES PATENTS

| | | | |
|---|---|---|---|
| 2,691,932 | 10/1954 | Sawyer et al. | 172—272 |
| 2,894,763 | 7/1959 | Karnath et al. | 280—504 X |
| 3,090,639 | 5/1963 | Virtue et al. | 280—474 |
| 3,312,478 | 4/1967 | Knaapi | 280—415 |

LEO FRIAGLIA, *Primary Examiner.*

U.S. Cl. X.R.

172—275, 450; 280—504